United States Patent [19]

Scott et al.

[11] 4,430,657

[45] Feb. 7, 1984

[54] PEN DRIVE FOR RECORDER

[75] Inventors: Larkin Scott, Forth Worth, Tex.; William C. Muellner, LaGrange Park, Ill.

[73] Assignee: The Perkin-Elmer Corporation, Norwalk, Conn.

[21] Appl. No.: 354,405

[22] Filed: Mar. 3, 1982

[51] Int. Cl.$^3$ .............. G01D 15/24; G01D 3/06
[52] U.S. Cl. .................... 346/32; 346/139 R
[58] Field of Search .................... 346/32, 139, 33

[56] References Cited

U.S. PATENT DOCUMENTS

| | | | |
|---|---|---|---|
| 2,886,759 | 5/1959 | Umrath | 346/32 X |
| 3,281,685 | 10/1966 | Talbot | 346/32 X |
| 3,383,699 | 5/1968 | Lapinski | 346/32 X |
| 3,683,402 | 8/1972 | Parnell | 346/139 R X |
| 3,806,948 | 4/1974 | Nagao et al. | 346/139 D X |
| 4,099,114 | 7/1978 | Hoopes et al. | 346/32 X |
| 4,343,012 | 8/1982 | Knapp | 346/139 R |

Primary Examiner—Donald A. Griffin
Attorney, Agent, or Firm—F. L. Masselle; E. T. Grimes; R. A. Hays

[57] ABSTRACT

A direct current servo motor operates through a toothed belt linkage to drive the pen carriage of a chart recorder. The position of the drive is monitored by a sectored encoder disc on the motor shaft. A pair of optical sensors is located relative to the encoder disc to provide alternately phased transition signals as corresponding edges of the encoder disc sectors pass the sensors when the motor rotates. A microprocessor interrupted by a transition signal goes to a sub-routine that determines which way the encoder disc is rotating and stores a count signal of the corresponding sign in a register. Further the microprocessor compares an input signal with the stored count signal and directs the motor to rotate in the direction that will reduce the difference or error signal to zero thus causing the pen to follow the magnitude of the input signal. The sub-routine also computes the rate of error change and applies a correction to motor speed or brakes the motor when the error approaches zero to prevent pen overshoot.

8 Claims, 11 Drawing Figures

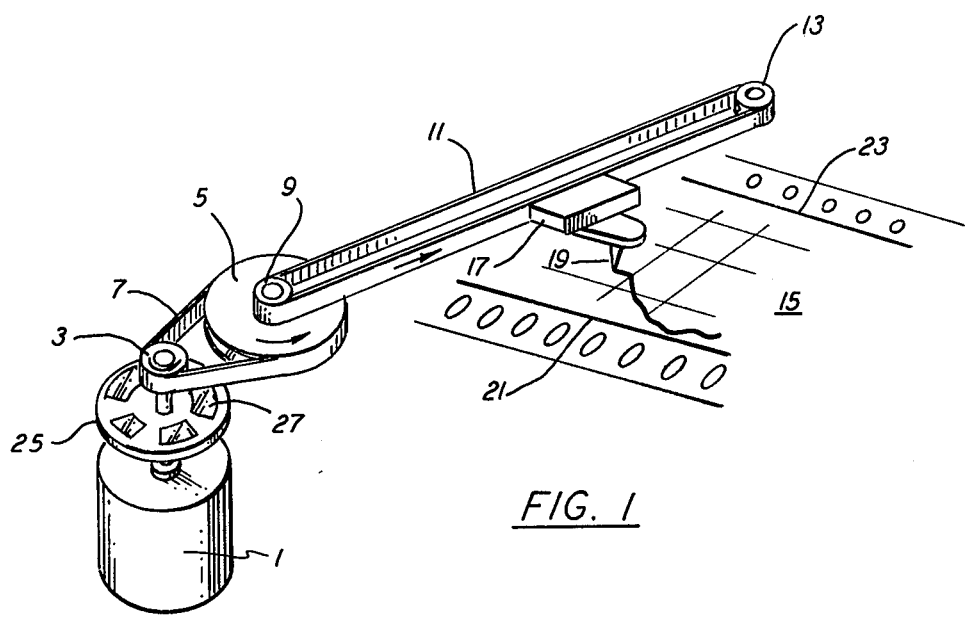
FIG. 1
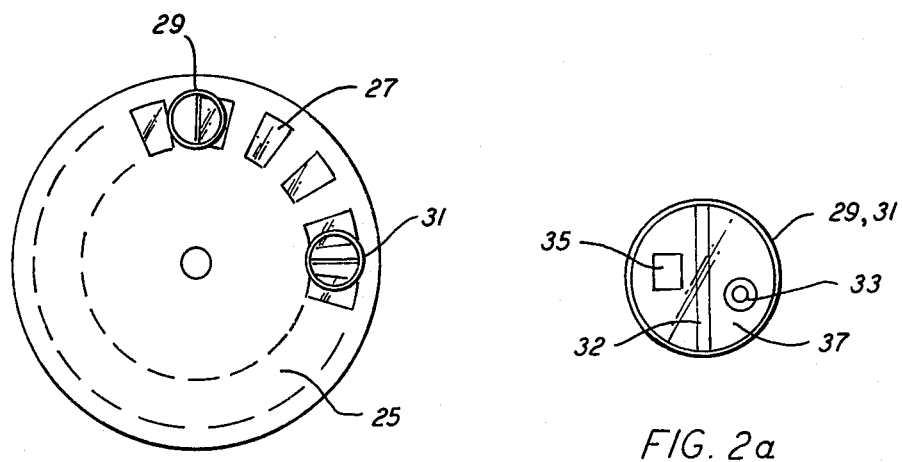
FIG. 2
FIG. 2a

```
PAGE 001  ENCO    .SA:0
```

| 00001 | | | * | | INTERRUPT SERVICE ROUTINE FOR ENCODER |
|---|---|---|---|---|---|
| 00002 | | | * | | LARKIN SCOTT  29 APRIL 1980 |
| 00003 | | | * | | |
| 00004 | | | * EXPECTS TWO QUADRATURE SIGNALS FROM ENCODER | | |
| 00005 | | | * USED AS IRQ INPUTS VIA PIA PORTS CA1 & CB1 | | |
| 00006 | | | * ALSO EXPECTS CRA & CRB IN PIA LOADED WITH $07 | | |
| 00007 | | | * | | |
| 00008 | 001C | A DISNUM | EQU | $001C | |
| 00009 | 8004 | A PIA | EQU | $8004 | |
| 00010A | 0150 | | ORG | $0150 | |
| 00011 | | | * | | |
| 00012A | 0150 CE 8004 | A ENCO | LDX | #PIA | |
| 00013A | 0153 A6 01 | A | LDAA | 1,X | GET CRA (OF PIA) IN A |
| 00014A | 0155 2B 05 015C | | BMI | ARTN | IF INT FLG SET IN CRA |
| 00015A | 0157 E6 03 | A | LDAB | 3,X | GET CRB (OF PIA) IN B |
| 00016A | 0159 2B 0F 016A | | BMI | BRTN | IF INT FLG SET IN CRB |
| 00017A | 015B 3B | | RTI | | OTHERWISE QUIT |
| 00018A | 015C E6 00 | A ARTN | LDAB | 0,X | DUMMY READ CLR INT FLG |
| 00019A | 015E 88 02 | A | EORA | #2 | CHANGE EDGE CONT BIT |
| 00020A | 0160 A7 01 | A | STAA | 1,X | RESTORE TO CRA |
| 00021A | 0162 A8 03 | A | EORA | 3,X | CHANGE A PER CRB |
| 00022A | 0164 85 02 | A | BITA | #2 | WHAT EDGE IS A ON NOW |
| 00023A | 0166 26 15 017D | | BNE | DNCTR | GO DEC & RTI |
| 00024A | 0168 20 0C 0176 | | BRA | UPCTR | GO INC & RTI |
| 00025A | 016A A6 02 | A BRTN | LDAA | 2,X | DUMMY TO CLR INT FLG |
| 00026A | 016C C8 02 | A | EORB | #2 | CHANGE EDGE CONT BIT |
| 00027A | 016E E7 03 | A | STAB | 3,X | RESTORE TO CRB |
| 00028A | 0170 E8 01 | A | EORB | 1,X | CHANGE B PER CRA |
| 00029A | 0172 C5 02 | A | BITB | #2 | WHAT EDGE IS B ON NOW |
| 00030A | 0174 27 07 017D | | BEQ | DNCTR | DEC & RTI |
| 00031A | 0176 DE 1C | A UPCTR | LDX | DISNUM | INC & RTI |
| 00032A | 0178 08 | | TNX | | |
| 00033A | 0179 DF 1C | A | STX | DISNUM | |
| 00034A | 017B 20 05 0182 | | BRA | TRAP | |
| 00035A | 017D DE 1C | A DNCTR | LDX | DISNUM | |
| 00036A | 017F 09 | | DEX | | |
| 00037A | 0180 DF 1C | A | STX | DISNUM | |
| 00038A | 0182 B6 8005 | A TRAP | LDAA | PIA+1 | (TRAP USED DEVELOPMENT ONLY) |
| 00039A | 0185 B4 8007 | A | ANDA | PIA+3 | |
| 00040A | 0188 2A 01 018B | | BPL | THRU | |
| 00041A | 018A 3F | | SWI | | |
| 00042A | 018B 3B | THRU | RTI | | |
| 00043 | | | END | | |

```
TOTAL ERRORS 00000--00000
```

| 015C | ARTN | 00014 00018* | | | |
|---|---|---|---|---|---|
| 016A | BRTN | 00016 00025* | | | |
| 001C | DISNUM | 00008*00031 | 00033 | 00035 | 00037 |
| 017D | DNCTR | 00023 00030 00035* | | | |
| 0150 | ENCO | 00012* | | | |
| 8004 | PIA | 00009*00012 | 00038 | 00039 | |
| 018B | THRU | 00040 00042* | | | |
| 0182 | TRAP | 00034 00038* | | | |
| 0176 | UPCTR | 00024 00031* | | | |

*FIG. 4a*

```
PAGE  001   SERVO    .SA:0
```

| 00001 |  |  |  | * | PROGRAMS USED WITH DC MOTOR/ENCODER COMBINATION |  |  |
|---|---|---|---|---|---|---|---|
| 00002 |  |  |  | * | LARKIN SCOTT   29 APRIL 1980 |  |  |
| 00003 |  |  |  | * |  |  |  |
| 00004 |  | 001C | A | OUTPUT | EQU | $001C |  |
| 00005 |  | 0006 | A | INPUT | EQU | $0006 |  |
| 00006 |  | 0008 | A | ERROR | EQU | $0008 |  |
| 00007 |  | 000D | A | LAST | EQU | $000D |  |
| 00008 |  | 0010 | A | TEMP | EQU | $0010 |  |
| 00009 |  | 000C | A | CTR | EQU | $000C |  |
| 00010 |  | 8004 | A | PIA | EQU | $8004 |  |
| 00011 |  | 0106 | A | SCAN | EQU | $0106 | MAIN DEMO PROG |
| 00012A | 00A0 |  |  |  | ORG | $00A0 |  |
| 00013 |  |  |  | * |  |  |  |
| 00014 |  |  |  | * FIRST PART COMPUTES ERROR SIGNAL |  |  |  |
| 00015 |  |  |  | * COMMENTS FIELD DEFINITIONS ARE: |  |  |  |
| 00016 |  |  |  | * E = CURRENT ERROR = INPUT - OUTPUT |  |  |  |
| 00017 |  |  |  | * E1 = E FROM LAST PASS |  |  |  |
| 00018 |  |  |  | * E2 = E + K(DELTA E) |  |  |  |
| 00019 |  |  |  | * DELTA E = E - E1 |  |  |  |
| 00020 |  |  |  | * K = SOME CONSTANT MULTIPLIER |  |  |  |
| 00021 |  |  |  | * |  |  |  |
| 00022A | 00A0 | 86 05 | A | ESIG | LDAA | #5 | PWR OF 2 = K+1 |
| 00023A | 00A2 | 97 0C | A |  | STAA | CTR |  |
| 00024A | 00A4 | DE 0D | A |  | LDX | LAST |  |
| 00025A | 00A6 | DF 10 | A |  | STX | TEMP | (TEMP NOW = E1) |
| 00026A | 00A8 | D6 07 | A |  | LDAB | INPUT+1 |  |
| 00027A | 00AA | 96 06 | A |  | LDAA | INPUT |  |
| 00028A | 00AC | D0 1D | A |  | SUBB | OUTPUT+1 |  |
| 00029A | 00AE | 92 1C | A |  | SBCA | OUTPUT |  |
| 00030A | 00B0 | D7 0E | A |  | STAB | LAST+1 |  |
| 00031A | 00B2 | 97 0D | A |  | STAA | LAST | (LAST NOW = E) |
| 00032A | 00B4 | D0 11 | A |  | SUBB | TEMP+1 |  |
| 00033A | 00B6 | 92 10 | A |  | SBCA | TEMP | AB = E-E1 = DELTA E |
| 00034A | 00B8 | 58 |  | EMUL | ASLB |  |  |
| 00035A | 00B9 | 49 |  |  | ROLA |  |  |
| 00036A | 00BA | 7A 000C | A |  | DEC | CTR |  |
| 00037A | 00BD | 26 F9 00B8 |  |  | BNE | EMUL | AB = (K+1)E - (K+1)E1 |
| 00038A | 00BF | DB 11 | A |  | ADDB | TEMP+1 |  |
| 00039A | 00C1 | 99 10 | A |  | ADCA | TEMP | AB = (K+1)E - (K+1)E1 + E1 |
| 00040A | 00C3 | D7 09 | A |  | STAB | ERROR+1 | AB = (K+1)E - KE1 |
| 00041A | 00C5 | 97 08 | A |  | STAA | ERROR | E2 = E + K(E - E1) |
| 00042A | 00C7 | 7E 019E | A |  | JMP | SERVO |  |
| 00043 |  |  |  | * NOTE HAVE ERROR + PSEUDO ERROR RATE |  |  |  |

*FIG. 5a*

```
PAGE 002   SERVO   .SA:0

00045                        * THIS PART OF PROG RUNS SERVO MOTOR
00046A 019E                     DRG      $019E
00047A 019E 2B 1E 01BE SERVO    BMI      ABMAG     IF E2 SIG IS NEGATIVE
00048A 01A0 86 01    A          LDAA     #1        GO FORWARD *
00049A 01A2 7D 0008  A TEST     TST      ERROR     HI BYTE ONLY
00050A 01A5 26 11 01B8          BNE      MTRB
00051A 01A7 DE 08    A          LDX      ERROR
00052A 01A9 27 24 01CF          BEQ      GOSCAN
00053A 01AB B7 8004  A MTRA     STAA     PIA       TURN MTR ON
00054A 01AE 09         LOOP     DEX
00055A 01AF 08                  INX
00056A 01B0 09                  DEX
00057A 01B1 8C FFF0  A          CPX      #-16      EFFECT ADD CONSTANT TO DELAY
00058A 01B4 26 FB 01AF          BNE      LOOP
00059A 01B6 86 03    A          LDAA     #3        OFF *
00060                        * NOTE OFF * NOT REACHED IF ERROR
00061                        * IS LARGGE (HI BYTE NOT ZERO)
00062A 01B8 B7 8004  A MTRB     STAA     PIA       MTR OFF IF SMALL ERROR
00063A 01BB 7E 0106  A          JMP      SCAN      BACK TO MAIN PROG
00064A 01BF 70 0009  A ABMAG    NEG      ERROR+1
00065A 01C1 26 05 01C8          BNE      AB1
00066A 01C3 70 0008  A          NEG      ERROR
00067A 01C6 20 03 01CB          BRA      AB2
00068A 01C8 73 0008  A AB1      COM      ERROR
00069A 01CB 86 02    A AB2      LDAA     #2        GO REVERSE *
00070A 01CD 20 D3 01A2          BRA      TEST
00071A 01CF CE 0000  A GOSCAN   LDX      #0
00072A 01D2 DF 0D    A          STX      LAST
00073A 01D4 7E 0106  A          JMP      SCAN
00074                           END
TOTAL ERRORS 00000--00000

01C8 AB1      00065 00068*
   01CB AB2      00067 00069*
   01BE ABMAG    00047 00064*
   000C CTR      00009*00023 00036
   00B8 EMUL     00034*00037
   0008 ERROR    00006*00040 00041 00049 00051 00064 00066 00068
   00A0 ESIG     00022*
   01CF GOSCAN   00052 00071*
   0006 INPUT    00005*00026 00027
   000D LAST     00007*00024 00030 00031 00072
   01AE LOOP     00054*00058
   01AB MTRA     00053*
   01B8 MTRB     00050 00062*
   001C OUTPUT   00004*00028 00029
   8004 PIA      00010*00053 00062
   0106 SCAN     00011*00063 00073
   019E SERVO    00042 00047*
   0010 TEMP     00008*00025 00032 00033 00038 00039
   01A2 TEST     00049*00070
```

*FIG. 5b*

PEN DRIVE FOR RECORDER

RELATED PATENT APPLICATIONS

This application is related to the following three U.S. patent applications filed on even date herewith, (1) Ser. No. 354,408 entitled "Variable Gain Amplifier", by William C. Muellner; (2) Ser. No. 354,407, entitled "Chart Recorder", by William C. Muellner and Larry E. Plunkett, and (3) Ser. No. 354,406, entitled "Strip Chart Recorder", By William C. Muellner and Walter Hvostik. Another related application is U.S. patent application filed Mar. 7, 1980, Ser. No. 128,029, entitled Manual Wavelength Adjustment for a Microprocessor Based Spectrophotometer, by Larkin B. Scott, Morteza M. Chamran, and Paul B. Williams.

BACKGROUND OF THE INVENTION

The present invention provides an improved means of driving a chart recorder pen so that it rapidly and accurately follows the magnitude of an input electrical signal being charted by the recorder. In the last several years the advent of analog to digital conversion systems has made it practical to convert an analog input signal into a digital number or count. The pen carriage is then moved across the chart a distance equivalent to this count thus making unnecessary the slidewire or other mechanical reference devices of the earlier analog systems. The usual motive power for the digital pen drive is a stepper motor, a motor that receives counted pulses of electrical power and moves through a predetermined angle for each pulse.

Recorder pen drives using stepper motors for this purpose have been limited by the nature of the motor to either low slewing speeds or low resolution in pen location. The stepper motor is large, noisy, expensive, runs hot even when stationary and is generally limited to around a maximum of four or five hundred steps per second. When driven by pulses from a circuit which generates and counts pulses to correspond to the magnitude of the input signal being recorded, the motor's rotation accurately follows the pulse count providing the rate is not too fast for the motor to respond. Should the rate be excessive or should the motor be obstructed or moved when not being pulsed, the pen location is lost.

The disadvantages of the stepper motor as a pen driving means can be avoided by using a lighter, less expensive, more efficient direct current motor preferably of the permanent magnet field type. This motor is not limited by principle to a maximum counting rate. The motor, per se, has no counting means, therefore, some counting or encoding device must be also driven by the motor. This has, in most encoder applications, comprised a disc with a multiplicity of circular rings having one, two, four, etc. sectors. This encoder disc is mounted on the shaft whose angular rotation is to be monitored. Contacts or optical pickups adjacent this disc would generate a digital number series as the disc revolved thus giving a digital count. As an encoder this device is effective but expensive and required a complex pickup system.

Therefore, it is an objective of the invention to provide the improvement of the direct current motor drive with a greatly simplified encoder disc and pickup system with both digital magnitude and direction of count being determined by a microprocessor sub-routine, thus eliminating the earlier expensive requirement of digitizing at the encoder disc.

A further objective is to provide an additional servo sub-routine to control the motor speed and direction of rotation through the same microprocessor and to provide error-rate damping control to achieve a high slew rate with negligible overshoot.

Yet another objective is to initiate these sub-routines by interrupt requests to a basic, low cost, multipurpose microprocessor which is also available to perform computation, range control, and other tasks set forth in related patent applications previously listed, these to be accomplished in the interim between interrupt requests.

A further objective is to provide a counter system which retains knowledge of the pen location irrespective of external physical displacement of the pen or obstruction of pen movement.

Another objective is to provide a simple automatic initialization procedure through the microprocessor for the counter system when the instrument is first turned on.

Another objective is to provide a software routine through the same microprocessor which applies a digital number generated by manual means to offset zero pen position on the chart as desired.

Yet another objective is to provide another coacting subroutine through the same microprocessor to prevent the pen from forcibly hitting mechanical end stops if excessive input is applied.

BRIEF DESCRIPTION OF THE INVENTION

The foregoing and other objectives and relationship to other functions executed by this recorder are made effective by the use of a direct current reversible motor or its equivalent capable of continuous rotation. Rotational motion is transformed into translation of the pen carriage by step-down gearing or by pulleys using a non-slip belt such as a toothed gear belt followed by an extended belt loop having the carriage attached to one side of the loop. Rotational motion of the drive system is monitored by two optical or electric pickups arranged to alternately sense the passage or transition of sector edges of a multiple sector encoder disc attached to and rotating with the motor shaft. Each alternate transitional signal or pulse edge provided by the pickups is delivered through a peripheral interface adaptor (PIA) to provide an interrupt request (IRQ) and direction of rotation data to a central microprocessor. The microprocessor on receiving the IRQ is operative to suspend its other programmed duties to determine direction of motion through a subroutine and to increment (or decrement) a counter for each interrupt. At programmed intervals the microprocessor by another sub-routine is operative to compare the input being recorded with the counter to determine the pen position error and required direction of rotation of the motor to reduce said error to zero. The microprocessor is also operative to compare the current error with previous (LAST) error to determine the error reduction rate and controls the motor's speed in proportion to the error magnitude. It also provides motor braking determined by error rate to eliminate the tendency to overshoot the zero error position. The novel short sub-routines of encoding and servo control take only a small part of the available time making it possible for the microprocessor to be free for other computation and control programs required for the operation of the recorder such as controlled amplifier gain for range control, manual zero correction through digital means, software pen stops, automatic chart advance and automatic chart return features; these added cooperating tasks being referred to in the foregoing list of related patent applications.

BRIEF DESCRIPTION OF THE DRAWINGS

The foregoing and other objects, advantages and features of the present invention are described below in further detail in connection with the drawings which form a part of the disclosure wherein:

FIG. 1 is a perspective view showing the mechanical arrangement of the pen drive;

FIG. 2 is an enlarged plan view showing a preferred form of encoder system;

FIG. 2a is an enlarged plan view showing an encoder pickup;

FIG. 4a shows typical object code for FIG. 4;

FIG. 5a shows typical object code for computation of error-rate correction for the servo sub-routine of FIG. 5;

FIG. 5b shows typical object code for servo motor control sub-routine of FIG. 5;

DETAILED DESCRIPTION

Figure 3:
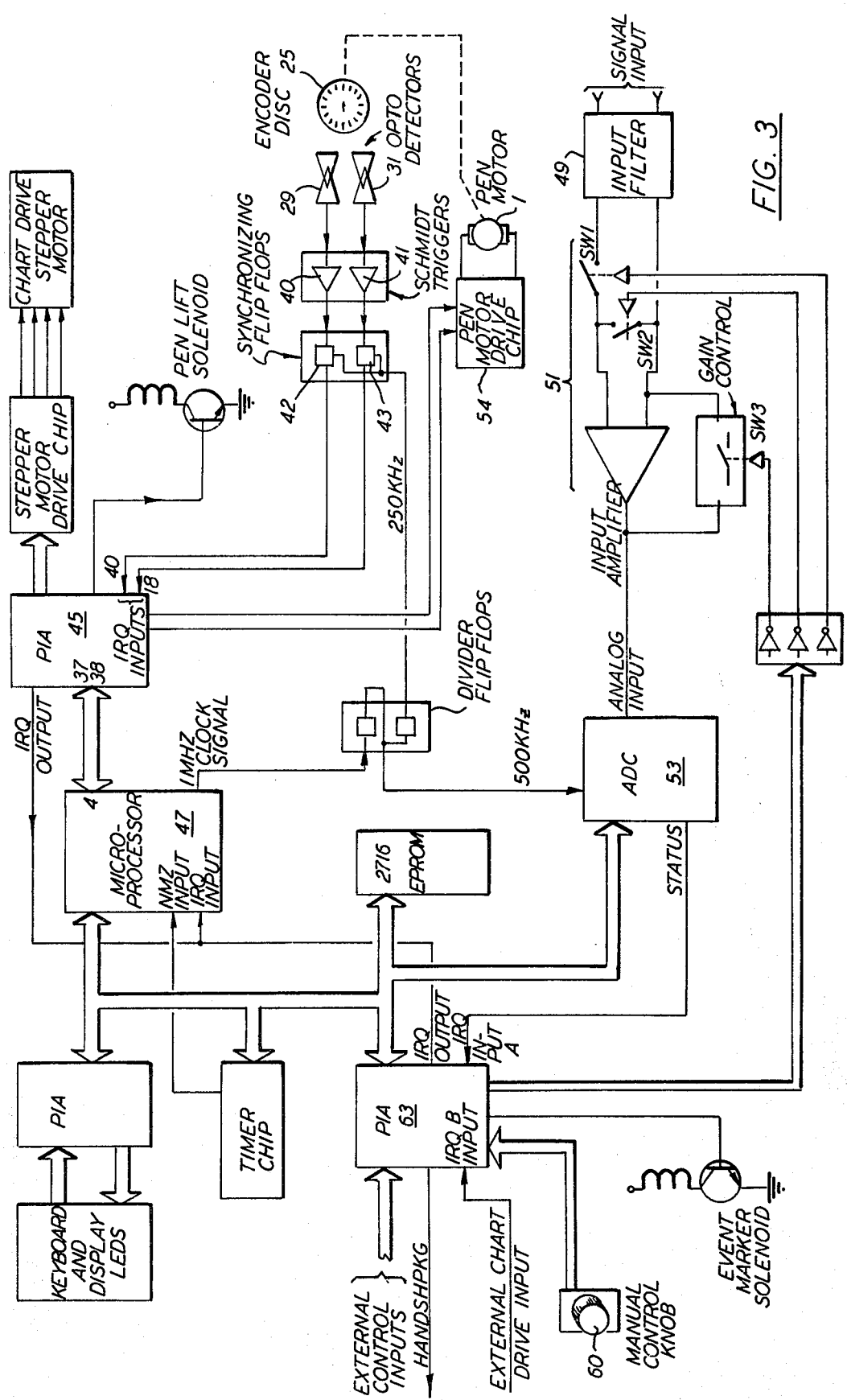
FIG. 3 shows a typical schematic block diagram of a recorder including the pen drive control system.

Referring to FIG. 1 of the drawings, a motor 1 has a pulley 3 attached to its output shaft to be rotated by the motor. A larger pulley 5 is supported to rotate freely when driven through a non-slipping means such as toothed belt 7. It will be apparent that the speed reduction thus afforded could also be effected by making the pulleys 3 and 5 meshed gears of suitable size ratio if so desired. A small pulley 9 disposed above or below pulley 5 and fixed in driven relation thereto supports one end of an endless drive loop, such as another toothed belt 11. The other end of this drive loop is supported by a freely rotatable pulley 13. The motor 1, pulleys 5, 9 and 13 are supported by the stationary frame of the recorder. Also supported by this frame is a paper drive system of conventional nature and familiar to one skilled in the art and hence not represented specifically in the drawing. This paper drive system drives a strip of chart paper 15. Affixed to one side of drive loop 11 is a positioning means comprising a pen carrier 17 which carries a pen 19. The pen is positioned in the conventional manner in writing relationship to the strip chart. The side of the loop 11 which is attached to the pen carriage is parallel to the transverse or ordinate lines of the chart paper grid. One or more guide bars, not shown, on which the pen carriage will slide freely may be disposed parallel to the side of the loop attached to the pen carriage to provide support from the stationary frame to the pen carriage as will be apparent to one familiar with recorder construction.

If now the motor rotates so as to drive pulley 3 in the direction shown by the arrow thereon, it will be apparent that pulley 5 and the belt 11 will move in the directions of the arrows shown on each, respectively. The pen will concurrently move up-scale on the chart, up-scale being designated as the direction from zero line 21 of the chart towards fullscale line 23. The linear distance the pen moves across the chart is accurately proportional to the angular rotation of the motor shaft.

To determine the rotation of the motor shaft an encoder disc 25 is fixed to and rotates with the motor shaft. This encoder disc is divided into sectors 27 which, in a preferred embodiment, have fifteen alternately reflecting and substantially non-reflecting or black surfaces of equal angular width. The radial size and number of these sectors are optional depending on the selected motor speed and the size of the coacting components.

In close proximity to the sectored face of the encoder disc but not touching it are mounted two optical pickups or sensors 29 and 31, FIG. 2. These pickups comprise a plastic body with a central barrier 32, as may be seen from the enlarged view of the face of a typical commercial pickup in FIG. 2a. On one side of the barrier is a light source consisting of a light emitting diode (LED) 33, and on the other a photo-transistor sensor 35. A hermetically sealed transparent window 37 covers the face of the pickup. The pickups are mounted so that their faces are toward the sectored side of the encoder disc with a clearance of typically ⅛" between face and disc surface. When a mirrored sector is aligned with a pickup the transistor output signal goes high. There is a steep transistion from low to high when the sector edge moves past the central barrier of the pickup from black to mirror as the light from the LED is reflected around the barrier and back to the photo-transistor. The transistion is from high to low when the sector edge moves from mirror to black. The two pickups are mounted so that these transistions occur alternately as a sector edge passes first one, then the other, pickup. In dynamic terms the phase angle between the two pickups is 90 degrees. For an encoder disc about one inch in diameter with 15 sectors it is only necessary to maintain ordinary manufacturing tolerances on the phase angle or location and on the matching of response of these pickups as our novel circuit and encoding program take care of normal variation is phase and photo-transistor output matching differences.

An equivalent alternate encoder disc means comprises alternate equal width opaque and light transmitting sectors. In this case, the light sources are mounted on one side of the disc; the photosensors are mounted on the other side and receive light through the transmitting sectors. It is, of course, apparent that conducting sectors and electrical brushes or magnetic sectors and magnetic pickups would also be an equivalent combination to the encoder system of the invention and within the spirit and scope of this invention.

Referring now to FIG. 3, which shows a schematic block diagram of a microprocessor controlled chart recorder utilizing our invention, the output encoder signal of each of the two pickups is first processed by using it to switch Schmitt triggers, 40, 41. Although the pulse height from a pickup may vary from time to time and from pickup to pickup, the output of the Schmitt trigger, as is known to the art, will be a uniform height vertical edged pulse suited to control a flip-flop 42, 43. The flip-flops are synchronized by enabling clock pulses at 250 kHz to ensure that the final pulse edges corresponding to the sector edge transistions of the encoder disc are properly spaced regardless of motor speed variations or reversals or errors in pickup location or matching. This will be described in more detail hereinafter.

The series of alternately interlaced transition signals are now connected via a peripheral interface adaptor 45 (PIA) to the IRQ input to the microprocessor 47. The microprocessor used in this embodiment is a Motorola MC6802 and the PIA may be an MC6820. Although with proper modifications, as will be understood by one skilled in the art, other equivalent microprocessors and PIA's can be used to practice our invention, the specific programs and connection details herein will refer to the above devices. Thus one encoder signal will be tied to PIA pin 40 (CA1) and the other to pin 18 (CB1), while pins 37 and 38 of the PIA are both tied to microprocessor IRQ input pin 4.

The inputs at CA1 and CB1 of the PIA are edge triggered and may be programmed individually to respond to either a rising or falling edge. This feature of the PIA is used to advantage by the routine with the result that an IRQ is generated for any transition of either encoder signal. Each input sets its own flag in the PIA which the routine examines to identify the interrupt and select the action required.

Figure 4:
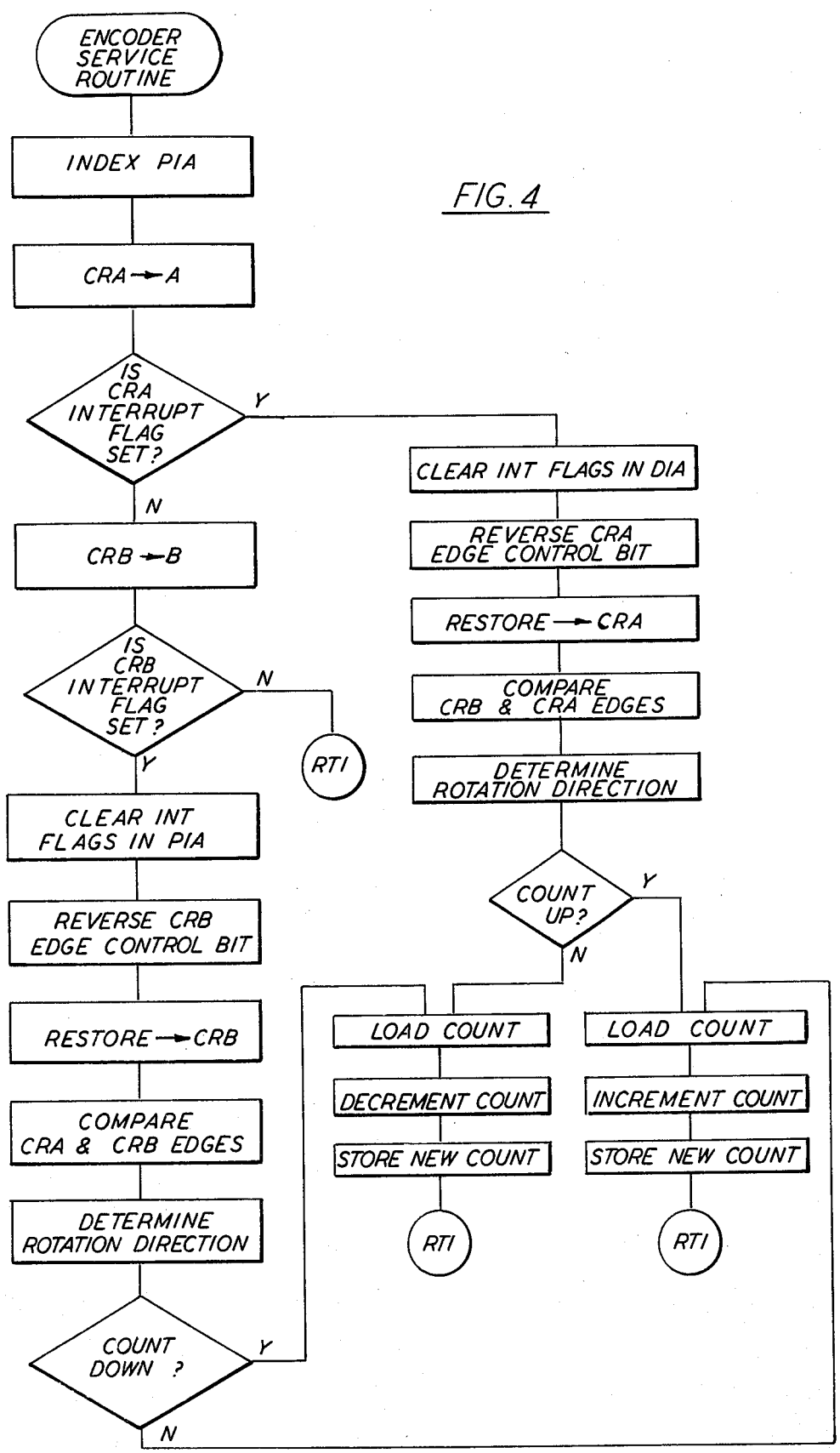
FIG. 4 is a simplified flow chart showing encoder service sub-routine.

The encoder service routine, shown in flow chart form in FIG. 4 and in object code form in FIG. 4a, includes the function of adding or subtracting one count in a software register which is then designated as the servo OUTPUT or as DISNUM, to use the labels shown in the program. Since the service routine is called for every transition of either encoder signal, and since there are four of these per cycle, the number of counts accumulated is four times the number sectors traversed by the encoder. The direction of count versus direction of rotation of the encoder may be reversed by transposing the two encoder signals.

Throughout the time the encoder is to be in use with this service routine the PIA involved must have the three least significant bits of both its control registers dedicated. Initialization of these consists of setting bit 0 high to actuate the CA1 and CB1 ports and bit 2 high to permit reading the peripheral data registers which is required to clear the PIA interrupt flags. The initial condition of bit 1 will depend on the exact angular position of the encoder sectors at the time indexing is done but is "don't care" otherwise.

Regarding the ideal condition of having the encoder signals 90 degrees out of phase, the division of each encoder section into four equal parts (and therefore into four uniformally spaced counts) would take place if the ideal condition prevailed. Otherwise the counts will not be uniformly spaced with regard to encoder angle but there is an absolute necessity for the transition of one encoder signal to lie between a pair of transitions of the other signal in time relationship. Furthermore a minimum time interval must be maintained between a transition of one signal and any transition of the other signal. This time interval is dictated by the execution time of the interrupt service routine and is equal to it on a continuous basis. In isolated cases two transitions could occur more closely spaced without loss of count since the PIA will capture (set interrupt flag) an interrupt at one port even while the service routine is being executed for the benefit of an input on the other port. Such an IRQ is then serviced at the conclusion of the first. Obviously this condition cannot be handled on a continuous basis.

The service routine given here, FIG. 4a, executes in slightly less than 100 cycles which for a 1 MHz clock puts an upper limit of 10 kHz on the speed with which encoder pulses may be counted by this method. In the recorder of the invention we typically slew the pen full scale using 2000 counts in 0.5 second, a speed of 4000 counts per second. This is well within the capability of the counter routine and faster than can reliably be executed by a stepper motor.

Figure 5:
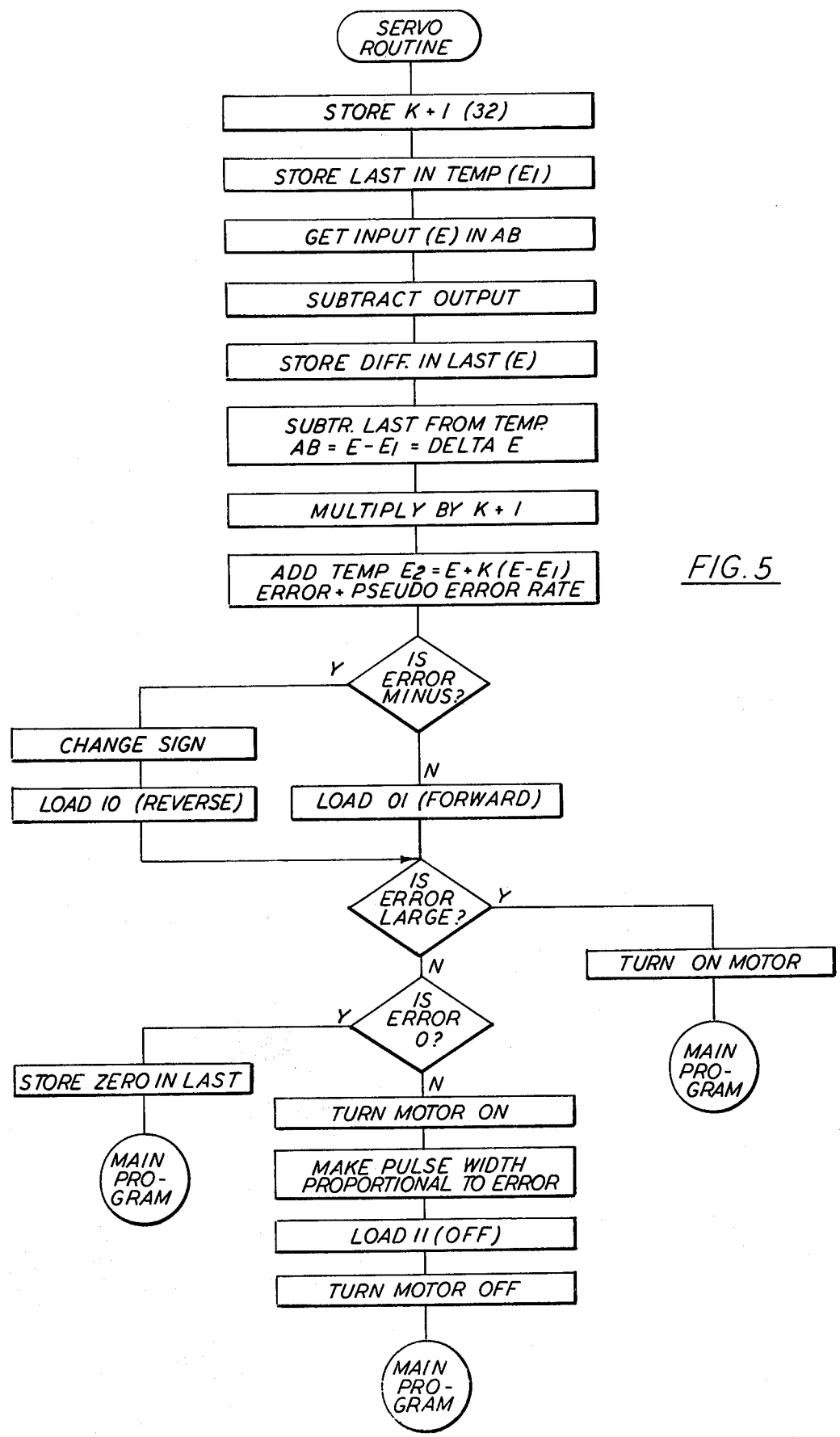
FIG. 5 is a flow chart showing servo control sub-routine.

The analog input to the recorder is also handled by the same microprocessor. Referring to FIG. 3 this input is filtered as required by an input filter 49. It is then passed through a divider network and a variable gain amplifier 51 for range selection. A preferred form of this range selection combination is referred to as item (1) in related patent applications: "Variable Gain Amplifier" listed earlier in this application. The adjusted analog signal is then converted to digital form by an analog to digital converter (ADC) 53. Details of the computation which follows are outlined in the servo routine flowchart FIG. 5 and the object code for the servo sub-routine FIG. 5a. The ADC output is stored continuously in a register designated as the input (INPUT) for the digital pen servo. Every millisecond or so the microprocessor program devotes attention to this register and to the register in which the pen position or counter value (designated OUTPUT or DISNUM) from the encoder service routine is stored. The input minus the counter value is computed to obtain a basic error signal (ERROR), i.e., the number of counts and direction the pen should be moved to show the input correctly. The difference between the error and the error value (LAST) stored during the previous program pass gives a measure of error rate. This is added in proper proportion to present error to obtain a final error signal consisting of error plus error rate. The motor then receives a voltage pulse whose polarity would reduce this final error and whose duration (pulse width) is proportional to absolute magnitude of the final error. Thus the motor is being driven toward the condition where its angular position agrees with the input digital value.

Voltage is always applied to the motor so that it is either full ON with appropriate polarity (one lead high, one low) or it is in an OFF state with both leads high (or low). The only element of proportional control achieved is due to pulse width modulation and this only comes into play for errors less than about $\frac{1}{8}$ full scale. For larger errors the motor is driven "flat out" to the maximum speed it can attain for a given supply voltage. When the error becomes less than the $\frac{1}{8}$ full scale threshold the average effect is a control voltage proportional to error.

For the small error condition where the motor voltage is applied in pulses the frequency of pulsation is determined by how often the main program can get around to servicing the pen servo among its various other chores. Once the servo error has been computed in a given program pass the motor is simply turned ON with appropriate polarity and if the error is small a timing loop proportional to a constant plus the error is entered. The constant is to allow for overcoming the motor inertia on small excursions. At the end of this timing loop the motor is turned OFF and it must then await the next program pass to experience the start of a new pulse. For large errors the timing loop is bypassed and the motor is not returned to the OFF state.

Figure 6B:
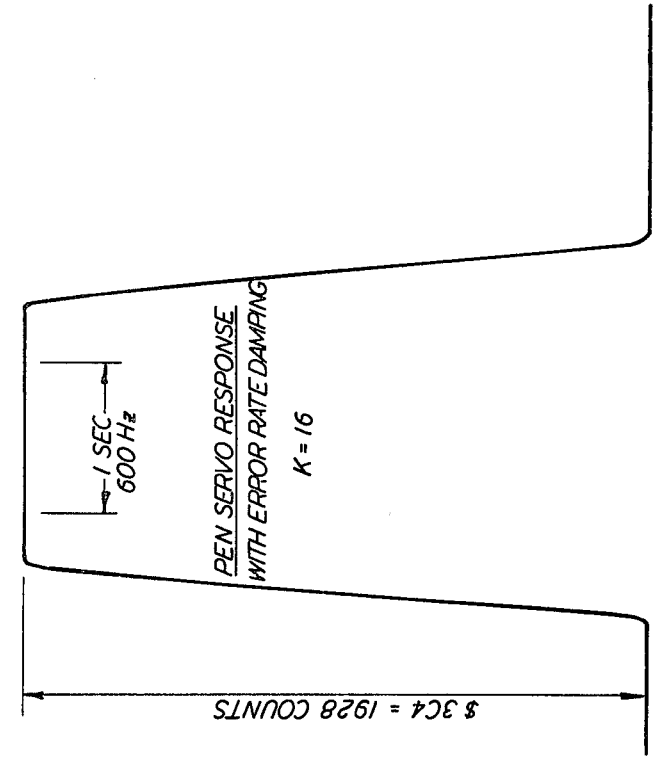
FIG. 6b is a graph showing recorder response to the same input step function with error-rate braking added.
Figure 6A:
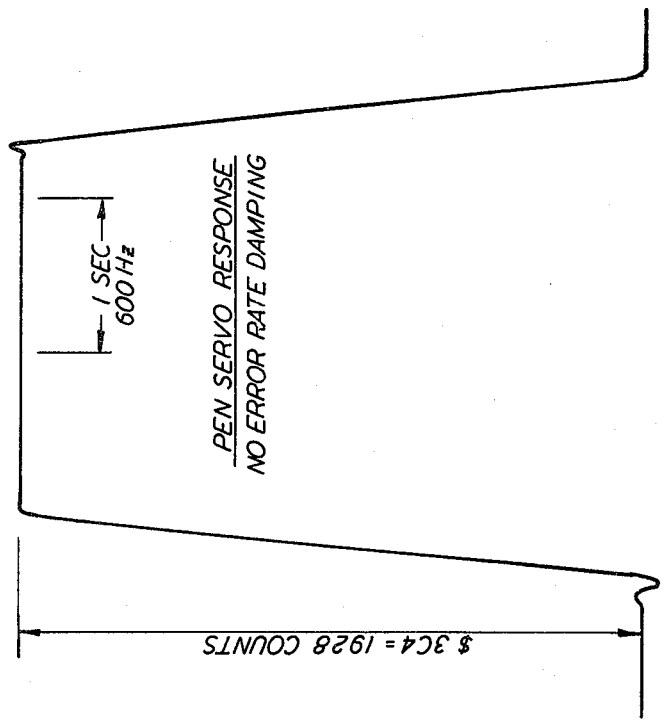
FIG. 6a is a graph showing recorder response to an input step function with dynamic braking only.

The motor, as shown in FIG. 3, is driven from the microprocessor via PIA 45 and a LM377 dual power amplifier chip 54 normally employed as the output device in stereo amplifier circuits. A single 15 volt power supply provides current for the motor via the amplifier chip. Control input to the chip comes directly from two PIA ports initialized as outputs. The OFF condition is created by storing binary 11 at the address of these ports, whereas binary 01 or 10 gives the ON condition in one or the other direction of rotation. Binary 00 would also give OFF but for this particular amplifier chip the dynamic braking is less for this condition. When the motor is in the OFF state both motor leads are essentially at the same voltage level and, since the impedance of the power amplifier is low, dynamic braking would bring the motor to rest but permit some overshoot. However, the inclusion of error rate in the motor servo routine has been able to substantially eliminate this overshoot. FIG. 6a shows the overshoot resulting in the recording of a step function input with dynamic braking alone. FIG. 6b shows the overshoot to be eliminated when the pseudo error-rate, K(E-E1), is incorporated in the servo routine. The constant K is chosen to give the optimum damping i.e., the least overshoot for the motor drive system being used. The inclusion of error rate results in "anticipation" of the onset of zero error as K(E-E1) becomes negative when E becomes small so that in the case of a step function input, for instance, the motor is actually braked to a stop at the final position by the occurrence of reverse torque.

Initial establishment of zero position for the encoder at turn-on of power to the recorder is performed as part of the microprocessor initialization program. IRQ's are masked while the motor is energized to drive the pen in the down counter direction to a mechanical stop. Pulses, typically ON 1, Off 2 milliseconds at a rate of several hertz, are used to minimize impact and 30 seconds is allowed for contact with the stop. The routine then loads DISNUM with minus 40 counts, the distance from the stop to the down scale chart edge. IRQ control is restored and zero (0) is loaded into the INPUT register. The pen will then drive to the 0 position leaving 0 in the counter (DISNUM) register.

A feature made possible by the invention is that the zero position on the chart may be offset as desired during operation by a manual ZERO adjustment 60, FIG. 3. This operates through PIA 63 and through the microprocessor to store any desired digital offset value, in the embodiment between −2000 and +2000 counts, in a register. Each time the microprocessor starts a computation using INPUT the offset will be added thereto from the register in which it is stored. This enables the operator to manually place zero position of the pen anywhere on the chart paper as desired. The software program and description of such a manual adjustment are subject of U.S. patent application Ser. No. 128,029 previously listed as a related patent application.

Another cooperating feature made possible by the invention also may be programmed through the microprocessor; a sub-routine for software limitation of travel of the pen drive. This eliminates the noise and possible mechanical damage common to previous recorders resulting from excessive input causing the pen carriage to forcibly drive off-scale and bang against a mechanical stop. To establish if the limitation or software stop at either end of the pen drive is necessary the sub-routine first examines the value of INPUT plus offset. If this value is positive it compares this sum with 2020, the predetermined count value of the appropriate software stop; if negative with −20. If the sum exceeds either limit the sum is ignored and 2020 or −20, respectively, is substituted. This number is then sent instead of INPUT to the servo routine. The pen will be driven to and stop at the corresponding value which acts as a software designated stop.

Although we have described in detail the operation and features of the preferred embodiment we do not wish to be limited to this particular use and construction. It should be apparent that our pen drive system can also be used for multiple pen recording and for drive along both axes in an X-Y recorder. In addition, this drive system can be readily adapted to driving the chart in a formatting type recorder to record as input any desired variable in addition to time. These and other uses of this drive will be apparent to one skilled in the art and can easily be made without departing from the spirit and scope of the invention as defined in the following claims.

What is claimed is:

1. A recorder pen drive comprising, in combination:
a reversible motor,
mechanical positioning means driven by said motor,
encoder means driven by said motor,
sensor means disposed to generate alternate transition signals during the motion of said encoder means,
a microprocessor with peripheral interface adaptor means connected to receive said transition signals and to apply said transition signals as interrupt requests to said microprocessor,
said microprocessor being operative to effect an encoder service routine initiated by said interrupt requests, to determine the direction of movement of said encoder means and to increment or decrement an output count according to said direction,
said microprocessor being operative to effect a servo routine to control the direction and speed of rotation of said motor, said control being determined by computing the difference between said output count and an input proportional to the signal input applied to the recorder, said input being compared to a software stop count equivalent to that of a predetermined software stop position and, if said input exceeds said software stop count, said software stop count is substituted for said input in said servo routine, and
means responsive to said servo routine to drive said motor.

2. The recorder pen drive of claim 1 wherein said motor is a permanent magnet motor reversible by reversing the polarity of its voltage input.

3. The recorder pen drive of claim 1 wherein said encoder means comprises an encoder disc driven by said motor, and said sensor means comprises a pair of sensor pickups disposed to generate alternate transition signals.

4. The recorder pen drive of claim 3 wherein each pickup comprises a light emitting diode and a photosensor.

5. The recorder pen drive of claim 3 wherein said encoder disc has a multiplicity of equal width light reflecting sectors interspaced by an equal number of equal width substantially non-reflecting sectors.

6. The recorder pen drive of claim 3 wherein said encoder disc has a multiplicity of equal width opaque sectors interspaced by an equal number of equal width light transmitting sectors.

7. A recorder pen drive comprising, in combination:
a reversible motor,
mechanical positioning means driven by said motor,
encoder means driven by said motor, sensor means disposed to generate alternate transition signals during the motion of said encoder means, a microprocessor with peripheral interface adaptor means connected to receive said transition signals to apply said transition signals as interrupt requests to said microprocessor, said microprocessor being operative to effect an encoder service routine initiated by said interrupt requests, to determine the direction of movement of said encoder means and to increment or decrement an output count according to said direction, said microprocessor being operative to effect a sero routine to control the direction and speed of rotation of said motor, said control being determined by computing the difference between said output count and an input proportional to the signal input applied to the recorder, wherein a digital offset value is added to said input before determining said control, the sum of said digital offset value and said input being substituted for said input, and means responsive to said servo routine to drive said motor.

8. The recorder pen drive of claim 7 wherein said input plus said offset is compared to a software stop count equivalent to that of a predetermined software stop position and, if said input plus said offset exceeds said software stop count, said software stop count is substituted for said input plus said offset in said servo routine.

* * * * *

UNITED STATES PATENT AND TRADEMARK OFFICE
CERTIFICATE OF CORRECTION

PATENT NO. : 4,430,657
DATED : February 7, 1984
INVENTOR(S) : Larkin Scott and William C. Muellner It is certified that error appears in the above-identified patent and that said Letters Patent are hereby corrected as shown below:

Column 9, line 12, change "sero" to --servo--.

Signed and Sealed this

Twenty-fifth Day of September 1984

[SEAL]

Attest:

GERALD J. MOSSINGHOFF

Attesting Officer    Commissioner of Patents and Trademarks